Patented July 24, 1923.

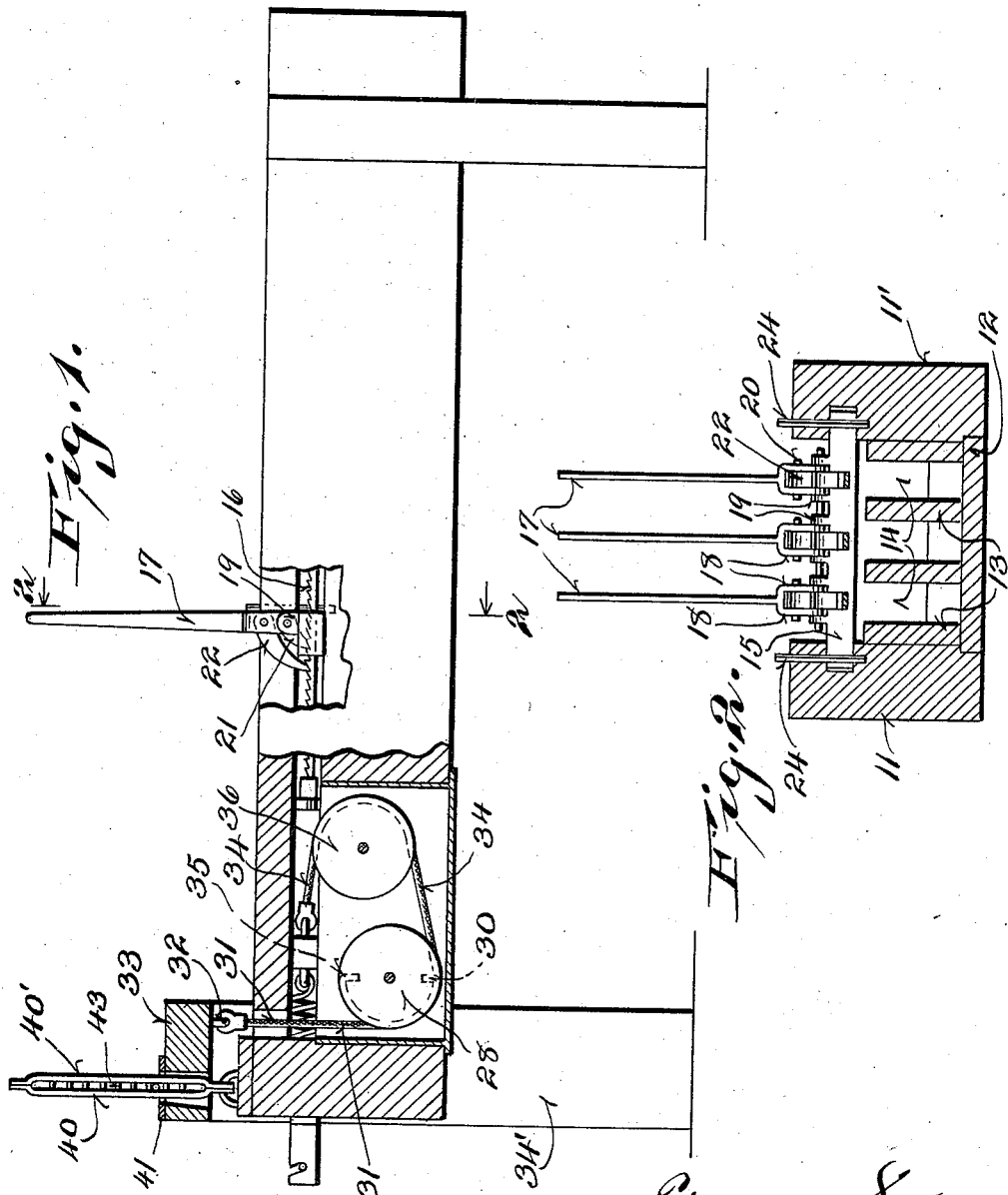

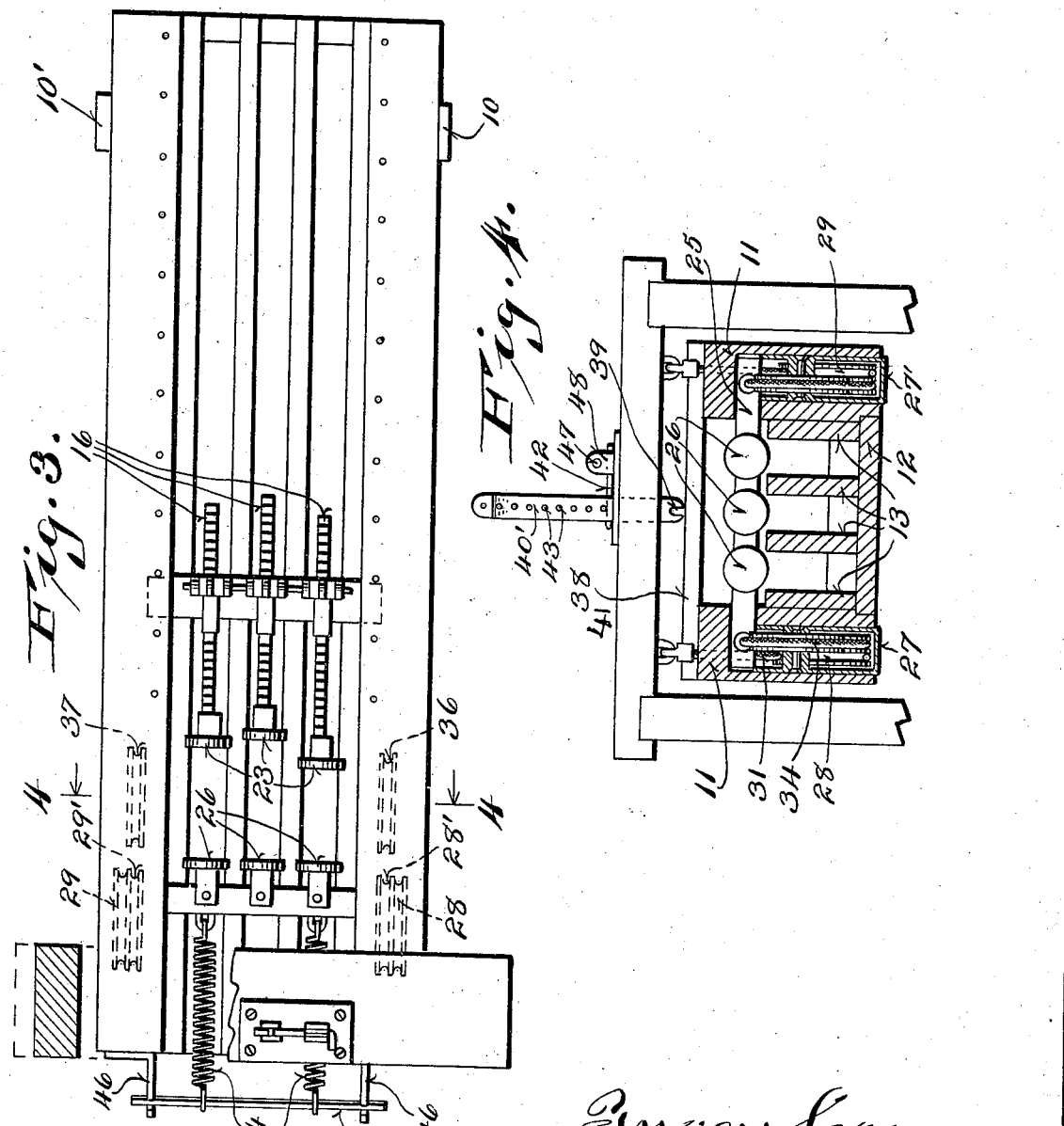

1,462,863

UNITED STATES PATENT OFFICE.

GUST KOHLMEIER, OF MANITOWOC, WISCONSIN.

CHEESE PRESS.

Application filed September 18, 1922. Serial No. 588,905.

*To all whom it may concern:*

Be it known that I, GUST KOHLMEIER, a subject of Germany, to become a citizen of the United States, and resident of Manitowoc, in the county of Manitowoc and State of Wisconsin, have invented certain new and useful Improvements in Cheese Presses; and I do hereby declare that the following is a full, clear, and exact description thereof.

The invention relates to that class of cheese presses, in which a number of cheeses are pressed in gangs at one operation, and which are provided with movable followers between which the cheeses are pressed.

In the use of these presses as heretofore constructed, it has been customary to first press the cheese to as great an extent as possible, and after the cheese has shrunk, by the escape of air and whey, to gradually press the same still farther until the cheese has been compressed to the desired degree.

The object of the invention is to utilize the weight of the machine and the cheese supported therein for pressing the cheese after it has been subjected to the initial pressure so as to exert a constant pressure upon the shrinking cheese and effect the subsequent and final compression thereof automatically. Means are provided for maintaining this pressure substantially constant throughout the entire compression.

With the above and other objects in view, which will appear as the description proceeds, my invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of the present invention constructed according to the best mode I have so far devised for the practical application of the principles thereof, and in which:

Figure 1 is a side elevation, with parts in section, of the cheese press.

Figure 2 is a cross section on the line 2—2 of Figure 1.

Figure 3 is a plane of the machine, and

Figure 4 is a cross section on the line 4—4 of Figure 3.

A pair of legs 10—10′ are rigidly secured to sides 11—11′ between which extend bottom 12. Longitudinal upright members 13, of which there are four, are spaced apart between the sides 11—11′, two of them contacting with the sides. Thus troughs 14 are formed for the reception of gangs of cheese. Sides 11—11′ are provided with longitudinal grooves in which the ends of rack frame 15 are movable. The rack frames are recessed to receive racks 16, three of which are illustrated. Any number of these racks may be provided.

Hand levers 17 are provided with pairs of arms 18 received between pairs of ears 19 extending upwardly from rack frame 15. An elongated transverse pivot 20 extends through the arms and ears and through the three small pawls 21, each of which is positioned between a pair of arms. Each pair of arms is provided with an additional pivot for a large pawl 22. The pawls are adapted to operate on the teeth of the racks and movement of the hand levers in one direction displaces the racks. The small pawls prevent movement of the racks in a reverse direction when the hand levers are moved backwardly. Thus the hand levers provide means for displacing the rack bars and moving the heads 23 carried thereby.

Sides 11—11′ are provided with vertical openings for the reception of pins 24. Rack frame 15 may be slid along in the grooves in the sides 11—11′ to a desired point. Then the pins 24 are inserted in openings immediately adjacent the rack frame and on the application of pressure to the heads 23, movement of the rack frame towards the right, looking at Figure 3, is prevented.

The pressure bar 25 extends between sides 11—11′, its ends being received in slots in the sides. To it are rigidly secured the heads 26. In the initial compressing operation, the gangs of cheese are deposited in the troughs between the upright members 13 and by the actuation of the hand levers 17, the cheese is compressed between heads 23 and 26. Air and whey escape from the cheese. On the shrinkage of the cheese to a desired degree, the operation of hand levers 17 is discontinued. Sides 11—11′ are cut away to receive housings 27—27′, the former housing receiving a pair of pulleys 28—28′, rigid with each other, and the latter having a similar pair of pulleys 29—29′.

At point 30 on the circumference of pulley 28 a cable 31 is secured passing upwardly about the pulley and terminating at a retainer 32 in a cross-piece 33 on vertical supports 34 which are spaced slightly laterally from sides 11—11'. A cable 34 is secured to pulley 28' at point 35 removed by substantially 180° from point 30. The cable passes about pulley 28' and over pulley 36 mounted also in housing 27 from which it extends to pressure bar 25, to which it is secured. Pulleys 29—29' are provided with similar cables, one of which extends over pulley 37 in housing 27' and is secured to pressure bar 25. A cross bar 38 extends from side 11 to side 11'. It has a U-shaped member 39 threaded through an eye in a pair of mating bars 40—40', each extending upwardly through an opening in cross-piece 33.

A plate 41 is secured to the upper surface of cross-piece 33 and a pin 42 may be inserted between mating bars 40—40' to cooperate with spaced rigid members 43, which secure the mating bars 40—40' together.

After the compressing operation, through the medium of hand levers 17, is discontinued, pin 42 may be removed. This permits the weight of one end of the machine to fall on cables 31, which tend to rotate the pulleys 28—28' and 29—29', tensioning cables 34 and moving pressure bar 25. This results in a continuous pressing action on the cheese. Even after considerable movement of the heads 26 the pressure on the cheese remains constant, as the weight acting to tension cables 31 and 34 remains constant. As the cable 34 extends from pulley 36 to pressure bar 25 in a substantially straight line, but little frictional resistance to movement is developed.

Springs 44 are secured at one end to pressure bar 25 and at the other to a rod 45 supported in notches in brackets 46 secured to cross-piece 33. When the compressing has proceeded to completion, a lever may be rested on pin 47 carried by ears 48 upwardly extending from plate 41, one end of the lever being brought in contact with one of the rigid members 43. Thus bars 40—40' may be lifted. This raises the ends of sides 11—11' and parts carried thereby and relieves tension on cables 31 and 34, permitting pressure bar 25 to move under the influence of springs 44. The cheese being removed, heads 23 may be varied in location, as desired, in an obvious manner, and the press is then in condition to be recharged with additional gangs of cheese.

I claim:—

1. In a device of the class described, the combination of a pair of sides having grooves therein, a pressure bar having its ends received in said grooves, heads on said pressure bar, a pair of pulleys, one of said pulleys being mounted on one of said sides, the other of said pulleys being mounted on the other of said sides, a pair of flexible members, one of said members being secured to one end of said pressure bar, the other being secured to the other end of said pressure bar, said flexible members passing over said pulleys and extending directly in the path of travel of said pressure bar, and means for imposing the weight of one end of said sides upon said flexible members.

2. In a device of the class described, the combination of a pair of sides having grooves therein, a pressure bar having its ends received in said grooves, heads on said pressure bar, a pair of pulleys secured rigidly together on one of said sides, a flexible member secured to one of said pulleys and passing about said pulley and upwardly therefrom, a support, said flexible member being secured to said support, a second flexible member secured to the other of said pulleys at a distance spaced along the circumference of said second pulley from the point of securement of said first mentioned flexible member, and an additional pulley positioned on one of said sides adjacent said pair of pulleys, said second flexible member extending over the said additional pulley and secured to said pressure bar.

3. In a device of the class described, the combination of a pressure bar, heads thereon, a pair of sides having grooves therein receiving the ends of said pressure bar, and resilient means urging said bar in one direction in said grooves.

4. In a device of the class described, the combination of a pressure bar, heads thereon, a pair of sides having grooves therein receiving the ends of said pressure bar, a rod, a pair of springs extending from said rod to said pressure bar and urging said pressure bar towards said rod, and a support for said rod.

5. In a device of the class described, the combination of a pair of sides having grooves therein, legs supporting one end of said sides, a pressure bar having its ends slidable in said grooves, resilient means urging said pressure bar in one direction, a pair of flexible members, each secured to an end of said bar, a pulley on each of said sides, each of said flexible members passing over one of said pulleys, and means for imposing the weight of said sides on said flexible members, whereby said pressure bar is moved against the action of said first mentioned means.

In testimony that I claim the foregoing I have hereunto set my hand at Manitowoc, in the county of Manitowoc and State of Wisconsin.

GUST KOHLMEIER.